No. 641,011.  
G. HEIDEL.  
BATTERY.  
(Application filed Feb. 4, 1899.)
Patented Jan. 9, 1900.
(No Model.)
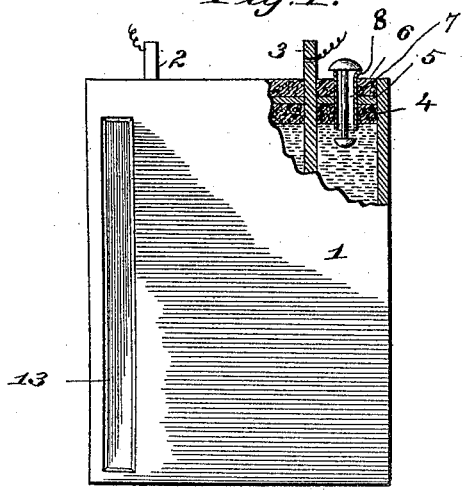
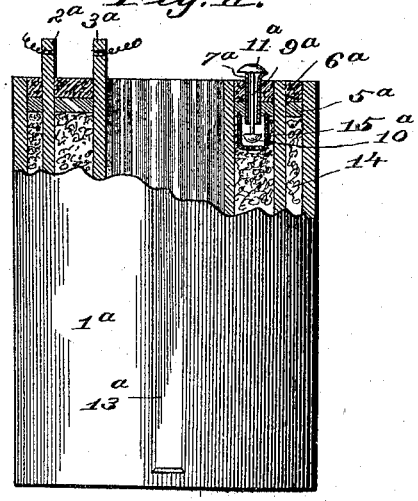
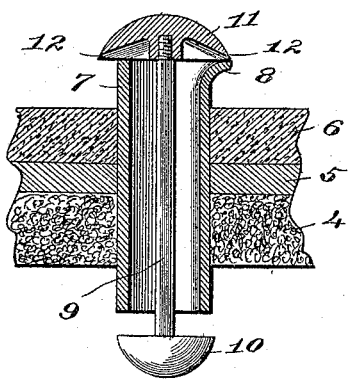
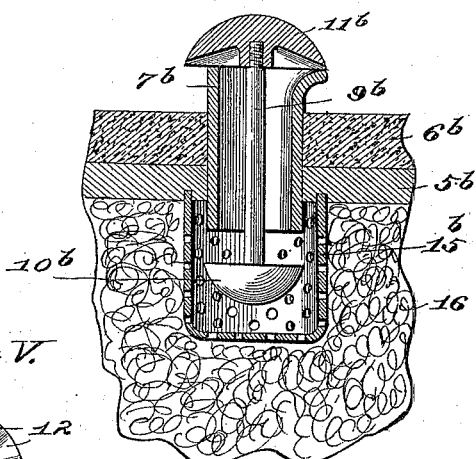
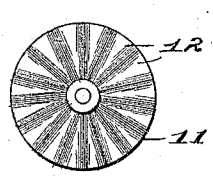
Witnesses  
Inventor  
Gustavus Heidel  
By Knight Bros.  
Attorneys

UNITED STATES PATENT OFFICE.

GUSTAVOS HEIDEL, OF ST. LOUIS, MISSOURI, ASSIGNOR TO THE GLOBE ELECTRIC COMPANY, OF SAME PLACE.

BATTERY.

SPECIFICATION forming part of Letters Patent No. 641,011, dated January 9, 1900.

Application filed February 4, 1899. Serial No. 704,486. (No model.)

*To all whom it may concern:*

Be it known that I, GUSTAVOS HEIDEL, a citizen of the United States, residing at the city of St. Louis, in the State of Missouri, have invented a certain new and useful Improvement in Batteries, of which the following is a full, clear, and exact description, reference being had to the accompanying drawings, forming part of this specification.

My invention relates to sealed batteries, and comprises a peculiar construction of vent therefor and improved means for sealing the battery.

My invention consists in features of novelty hereinafter fully described, and pointed out in the claims.

Figure I is an elevation of a battery of the wet type with a part of the upper portion shown in vertical section. Fig. II is an elevation of a battery of the dry type with the upper portion shown in vertical section. Fig. III is an enlarged vertical sectional view taken through the sealing of the battery and vent shown in Fig. I. Fig. IV is a similar view to Fig. III of the battery-sealing and vent shown in Fig. II and showing absorbent packing adapted to be used in a wet battery to absorb the liquid thereof. Fig. V is a detail view of the under side of the vent-cap.

Referring first to the form of device shown in Figs. I and III, 1 designates the cell of the battery, which contains the electrodes 2 and 3. This form of cell is designed to receive a liquid, and the liquid is confined by a sealing composed of a lower layer 4 of suitable material that will readily float, preferably comminuted cork. On the lower layer 4 is placed an intermediate layer 5 of waxy substance, such as paraffin, which is supported by the floating layer 4. Surmounting the layer of paraffin 5 is an upper layer of plaster-of-paris 6. The lower layer 4 is only designed to form a support for the surmounting layers 5 and 6 which would otherwise descend into the liquid, and the surmounting layers 5 and 6 effect the sealing of the battery.

In the batteries that have their contents sealed in their cells it is highly important that a vent should be provided in order to prevent the accumulation of gas within the battery-cell, which would cause a fracture or blowing out of the seal, and for this reason I have provided a vent that permits the escape of any gas that might become present within the battery. This vent is composed of a tube 7, inserted in the seal and open to communication with the interior of the battery-cell and the exterior atmosphere. Within the tube 7 is a stem 9, provided with a button 10 on its lower end, adapted to move to and seat against the inner end of the tube 7 in the event of the battery being upset or inverted, so as to close the communication into the vent-tube from the battery and prevent the escape of the battery contents. The upper end of the stem 9 connects with a cap 11, that rests against the outer end of the tube 7. This cap is provided on its under surface with convolutions 12 for the purpose of providing grooves through which the gases may find egress in their escape through the vent-tube from the battery. The vent-tube 7 is provided with a lip 8, adapted for the purpose of permitting the more ready insertion of the battery solution through the vent-tube in charging or recharging the battery, as by simply raising the cap 11 to a sufficient extent to leave the lower end of the tube open the solution may be poured onto said lip to flow into the battery-cell.

13 designates a transparent sight-plate located in the wall of the battery-cell 1, through which the contents of the battery may be observed without removing the seal, thereby allowing for an inspection of the battery contents at any time in order to determine whether the battery should receive attention.

The battery shown in Figs. II and IV is of the dry type. $1^a$ designates the cell, and $2^a$ and $3^a$ the electrodes, which latter are shown of circular or cup form. This type of battery contains dry chemicals 14, on which a layer $5^a$, of paraffin, is placed, the layer of comminuted cork not being required in this type of battery. On the layer $5^a$ is a layer $6^a$, of plaster-of-paris, and is provided with the stem $9^a$, carrying the button and cap of the same form as shown in Figs. I, III, and V. To protect the lower end of the stem $9^a$ and the button thereon, I provide a perforated cap 15, that incloses the vent-button to allow of its free play without interference from the chemicals in the battery.

In Fig. IV, I have shown the sealing layers 5ᵇ and 6ᵇ supported on a filling 16, which is of absorbent nature, preferably sponge or cotton-waste. This filling is designed to be used in a wet battery to absorb and hold the liquid. In this form of construction of battery the layer of comminuted cork is unnecessary, as the absorbent filling provides a support for the layers of sealing material. The vent in this latter construction is similar to that shown in Fig. II.

I claim as my invention—

1. A battery comprising a cell, electrodes, sealing layers, a vent-tube extending through the sealing layers, and a stem extending through the vent-tube having a cap at its upper end seating on the vent-tube, and a button at its lower end adapted to close the lower end of the vent-tube; substantially as described.

2. A battery-cell, a sealing therefor to confine its contents, and a vent comprising a tube, a movable stem in said tube having a button at its lower end, and a cap at its upper end, said cap being provided with a convoluted under surface, substantially as described.

3. A battery comprising a cell, electrodes, sealing layers, a vent-tube having a filling-lip, and extending through the sealing layers, and a stem extending through the vent-tube, having a cap at its upper end seating on the vent-tube over the lip, and a button at its lower end adapted to close the lower end of the vent-tube; substantially as described.

4. A battery comprising a cell, electrodes, sealing layers, a vent-tube extending through the sealing layers, a stem extending through the vent-tube having a cap at its upper end and a button at its lower end, and the perforated cap inclosing the lower end of the vent-tube and button, and secured to the sealing layers; substantially as described.

GUSTAVOS HEIDEL.

In presence of—
E. S. KNIGHT,
STANLEY STONER.